UNITED STATES PATENT OFFICE.

DANIEL KAEMPFE AND CARL LIST, OF NEWHAUS, SCHWARZBURG-RUDOLSTADT.

IMPROVEMENT IN COMPOUNDING CHINA-CLAY TO IMITATE MARBLE, MOTHER-OF-PEARL, &c.

Specification forming part of Letters Patent No. 105,089, dated July 5, 1870.

We, DANIEL KAEMPFE and CARL LIST, of Newhaus, Schwarzburg-Rudolstadt, have invented and produced Imitations of Various Kinds of Real Marble and of Mother-of-Pearl Shell.

These said imitations of marble and mother-of-pearl are effected and produced by skillfully mixing certain proportions of the white and the artificially-colored china-clay when the clay has reached that stage of preparation at which it may be molded into any given form, and by adding to such articles, after the process of molding is complete, such glazing or lustering, or both glazing and lustering, as shall be necessary to give the articles so manufactured the amount of brilliancy which is desired. The coloring of such white china-clay, which we use to produce the veins in our imitations of marble and of mother-of-pearl shell, is effected by us, as far as blue or green color is wanted, by adding to the white china-clay, during its fluid state in the mill-tub, after the said clay has been for five or six days in process of grinding, and after it has been filtered from all impurities and is perfectly ready to be pressed out for molding or shaping in any desired form, first, oxide of cobalt, to produce the blue color, and, second, oxide of chromium, to produce the green color. These oxides are in their dry state, and they are thoroughly mixed by grinding both substances together with the said white china-clay until the white clay has incorporated with itself the said oxides to their minutest parts and the clay and oxides have become perfectly homogeneous. This grinding usually requires two days' time.

The proportions of the two oxides to the white china-clay are, twenty ounces oxide of cobalt to one German hundred-weight white china-clay and twenty-four ounces oxide of chromium to one German hundred-weight white china-clay, thirty ounces (loth) being equal to one pound of the German hundred-weight.

To manufacture red-colored china-clay, by which the red veins in our imitations of marble and of mother-of-pearl shell are produced, we add to the white china-clay, during its fluid state in the mill-tub, after the said clay has been for five or six days in process of grinding, and after it has been filtered from all impurities and is perfectly ready to be pressed out for molding or shaping in any desired form, first, a solution of pure gold in *aqua regia*, and by grinding this solution of gold together with the said white china-clay until the clay is thoroughly permeated by the solution. This process usually occupies twenty-four hours. To one German pound white china-clay we add one and a quarter ace of pure gold, dissolved in five aces of *aqua regia*.

The proportions above stated of oxide of cobaltum, oxide of chromium, and solution of gold to the white china-clay are those which we generally follow. These proportions, however, are not the only ones which we can follow. They may differ relatively, as we wish to give more or less intensity of color to the veins in our imitations of marble and of mother-of-pearl shell.

After the coloring of such white china-clay as is destined to produce the veins in our imitations of real marble and of mother-of-pearl shell is executed as described, the colored china-clay is pressed out in bags, in the same manner that this is usually done with the white china-clay when the same is sufficiently ground in the mill-tub, and after it has been filtered from all impurities and is perfectly ready to be pressed out for molding or shaping in any desired form.

Having thus produced humid blocks of colored china-clay, these blocks are, as well as blocks of white china-clay, cut into plates of the required thickness by means of an iron wire, which cuts easily through the said blocks. For this purpose the blocks of clay are placed between two "leisten" or strips of wood, which are fastened on a table, and by means of which the clay is sliced from the blocks. The said strips between which the different sorts of clay are laid, and over which the wire passes in being drawn through the blocks of china-clay, give to the plates of colored china-clay the thickness of one-eighth inch and to the plates of white china-clay the thickness of one-half inch, or in any other proportion that may be desired. Such plates of colored and of white china-clay we then put one upon another, and according to the colors desired.

Further, to prevent the veins in our imitations of marble and of mother-of-pearl shell from running in one and the same direction, we recut the new blocks one or twice (which we have produced by placing one plate of a certain color upon another) at right angles to the first cutting, and put these recut parts again in opposite directions upon each other. With this mixture or veined china-clay the operation of molding and shaping into any given forms is performed; and to obtain on the surface of articles so formed a nice design of veins, we cut plates from the blocks of veined china-clay, of which plates we put the newly-cut side on the face of the mold.

Toy marbles or marbleized-china balls we produce by cutting out of the above-described veined china-clay dies of about the size of the desired ball, and by turning these dies, when they are nearly dry, through tin patterns till they are quite round and reach the exact size wanted.

The manipulations of glowing, glazing, and finally the burning of articles that are formed or shaped out of our veined china-clay are the same which articles always undergo that are formed or shaped out of the common white china-clay.

To give to our imitation of marble and of mother-of-pearl shell the great and silverish brilliancy which the articles show, we overpaint thickly the objects formed or shaped out of our veined china-clay after they have been glowed, glazed, and finally reburnt with the so-called "white luster." This process completed, the objects so lustered are subjected to the necessary exposure to a strong heat, in order to bring out and fix the brilliancy of the luster, and then they are decorated with gold or in any desired manner.

Claim.

We claim as our invention—

The manufacture and preparation of a compound of china-clay, by which every kind of real marble and mother-of-pearl can be imitated, and that our process is adapted not only to the manufacture of fancy articles, but in fact to every possible purpose, useful and ornamental, for which the common china material may be used, all substantially as specified.

DANIEL KAEMPFE.
CARL LIST.

Witnesses:
MAGNUS PISCHER,
ARNO KAEMPFE.